United States Patent [19]
Schneider

[11] Patent Number: 5,078,181
[45] Date of Patent: Jan. 7, 1992

[54] CONVEYING HOSE HAVING AT LEAST ONE COLLAR-LIKE FLOATING MEMBER

[75] Inventor: Klaus Schneider, Hamburg, Fed. Rep. of Germany

[73] Assignee: Eddelbüttel & Schneider KG, Seevetal, Fed. Rep. of Germany

[21] Appl. No.: 562,082

[22] Filed: Aug. 2, 1990

[30] Foreign Application Priority Data

Aug. 2, 1989 [DE] Fed. Rep. of Germany ... 8909324[U]

[51] Int. Cl.⁵ .................................................. F16L 55/00
[52] U.S. Cl. .................................................. 138/103
[58] Field of Search ............... 138/103, 109, 110, 172, 138/178, 121, 173, 174; 405/171; 441/133

[56] References Cited

U.S. PATENT DOCUMENTS

| | | | |
|---|---|---|---|
| 2,142,542 | 1/1939 | Wallach | 138/115 |
| 2,733,176 | 1/1956 | Balis | 138/109 |
| 3,119,415 | 1/1964 | Galloway et al. | 138/103 |
| 3,489,182 | 1/1970 | Cameron | 441/133 |
| 3,989,067 | 11/1976 | Gates, Jr. | 138/103 |
| 4,386,919 | 6/1983 | Kadono | 441/133 |
| 4,764,137 | 8/1988 | Schulte | 441/133 |
| 4,789,005 | 12/1988 | Griffiths | 138/178 |
| 4,966,741 | 10/1990 | Rush et al. | 138/103 |

FOREIGN PATENT DOCUMENTS

2004007  9/1970  Fed. Rep. of Germany ...... 441/133

Primary Examiner—Timothy F. Simone
Assistant Examiner—Reginald L. Alexander
Attorney, Agent, or Firm—Robert Becker W. & Associates

[57] ABSTRACT

A conveying hose having a hose wall that is provided with reinforcement is provided. The hose wall also has at least one segmented, collar-like floating member that extends about the hose, and has at least one shoulder that is disposed on the outer side of the hose, extends about the periphery thereof, and extends into a correspondingly shaped recess of the floating member. In the region of the shoulders, both outwardly and inwardly of the reinforcement, outer and inner support elements are embedded in the hose wall. These support elements prevent an enlargement of the circumference of the hose when internal pressures increase, and prevent a reduction of the circumference of the hose when axially directed tension stresses increase.

11 Claims, 2 Drawing Sheets

CONVEYING HOSE HAVING AT LEAST ONE COLLAR-LIKE FLOATING MEMBER

BACKGROUND OF THE INVENTION

The present invention relates to a conveying hose having a hose wall that is provided with reinforcing means, at least one segmented, sleeve or collar-like floating member that extends about the hose, and at least one shoulder that is disposed on the outer side of the hose, extends about the periphery thereof, and extends into a correspondingly shaped groove or recess of the floating member, for suction dredgers or loading and unloading stations of tankers that are riding at anchor in roadsteads.

Conveying hoses of this general type, which are known from DE-OS 2 004 007, are assembled to form conduits that can float and through which the material dredged up by suction dredgers, for example while producing or deepening navigable waters or during the recovery of gravel and sand, is conveyed to the shore. Such floatable conduits are intended to allow a dredger to alter its location in an unobstructed manner over a wide range. Similar requirements are also set for conduits that are comprised of the known conveying hoses and are connected to tankers that are riding at anchor in roadsteads, with these conduits also having to follow the movements of the tankers caused, for example, by currents, wind, and heavy seas. In this connection, the hose shoulder that extends into a recess in the floating member is intended to prevent the floating member from altering its position on the hose due to the constant movement of the floating hose, and to prevent the floating members from possibly gathering at one point. This would have a considerable adverse effect upon the balance or uniform floatability of the hose, and could overstress the hose and its connections on the dredger, tanker, or unloading stations to such an extent that failure of the hoses and tubes is not out of the question.

The tension forces that act upon such large hoses, which preferably have diameters of 500 mm and more, and that are caused, for example, by tidal currents, result in a considerable stretching of the length of the conduit that with the individual conveying hoses can cause a reduction of the circumference that is so great that the shoulders can no longer fulfill their task of positioning the floating member on the hose. Furthermore, disruptions during conveying of the dredged material can cause increases in pressure in the conveying hose that widen the hose to such an extent that the floating members, which extend about the hose and have fixedly interconnected sections, break or fly off of the hose.

It is therefore an object of the present invention to embody a conveying hose, especially one having large diameters, that is provided with floating or buoyancy members in such a way that the forces that act upon the hose neither damage the floating members nor promote axial shifts of the floating members on the hose.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
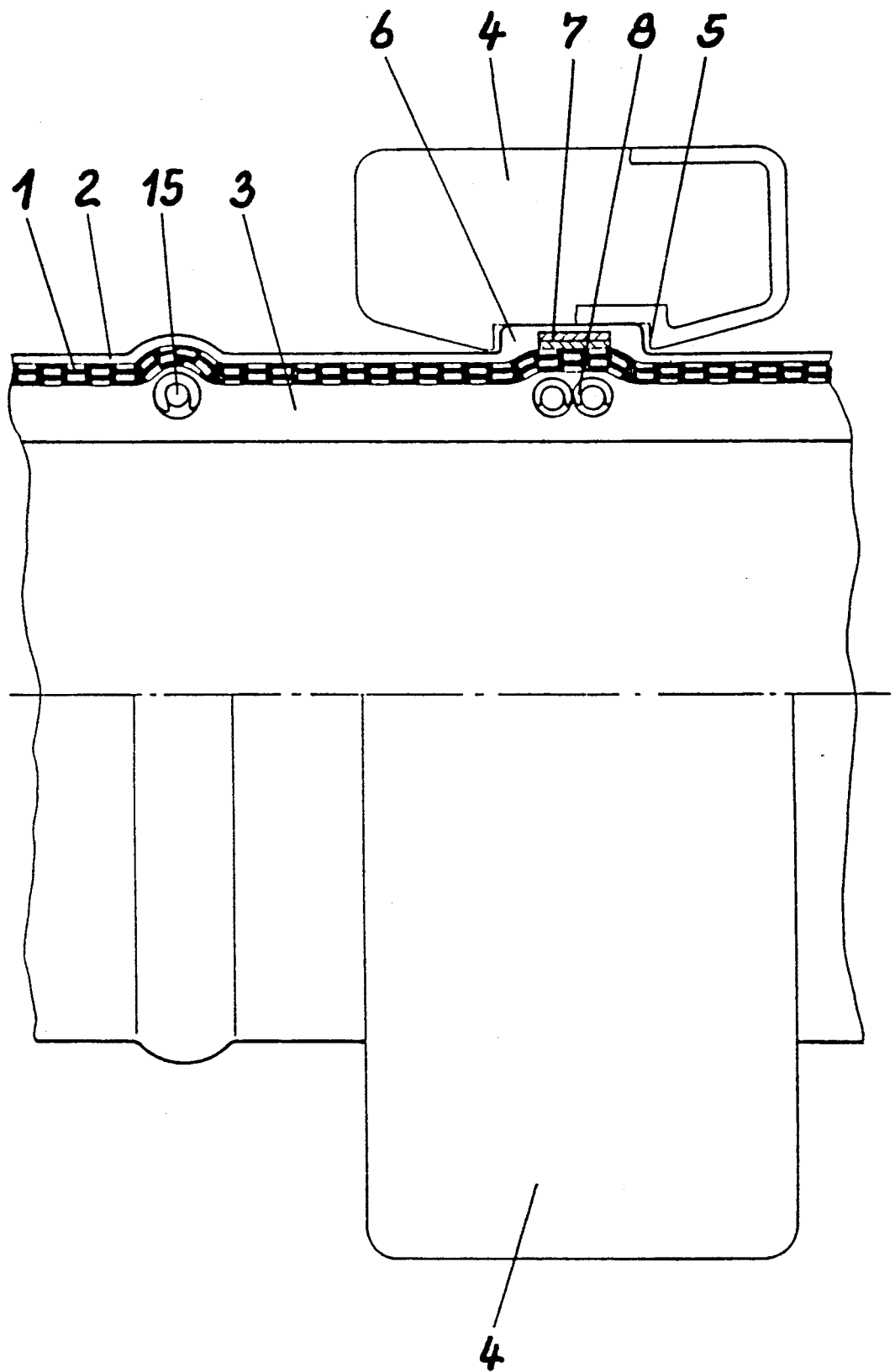
FIG. 1 is a partial cross-sectional view of a portion of one exemplary embodiment of the inventive hose.

Starting with a hose of the aforementioned general type, the hose of the present invention is characterized primarily in that in the region of the shoulders, both outwardly and inwardly of the reinforcing means, outer and inner support elements are embedded in the hose wall, with these support elements preventing an enlargement of the circumference of the hose when the internal pressure increases, and preventing a reduction of the circumference of the hose when axially directed tension stresses increase, all without adversely affecting the flexibility of the hose.

The support elements of the present invention are embedded in the wall of the hose, in the region that is to be protected, during the manufacture of the hose, so that upon later utilization of the hose, these support elements are in no way a disruptive part. Thus, pursuant to the present invention the forces that originate from the overpressure of the conveyed medium, and that expand the hose until the floating member is destroyed, are absorbed by the outer support elements that rest securely upon the reinforcing means, are comprised of at least one ply of a metallic and/or fabric mesh, and are in the form of rings or preferably a single or multi-ply coil having an inclination of approximately 90° to the axis of the hose. The inventive inner support elements, which are intended to prevent a reduction of the circumference of the hose resulting from stretching, are embodied as multi-part ring-shaped elements that extend over the circumference of the hose and are preferably embodied as a coil that is united to form a ring, with the windings of the coil contacting one another, and with the coil being embedded in the inner rubber of the hose below the reinforcing means. Due to the fact that the individual windings of the coil contact one another prior to vulcanization in the normal state, i.e. already upon embedment in the hose material, the nominal length of the inner support elements, and hence at the same time the smallest circumference of the hose shoulder that is critical for a reliable positioning of the floating member upon the conveying hose, are fixed; this is so because the inner support elements prevent not only a reduction of the circumference of the hose when it is subjected to tension stresses, but also prevent a shrinkage of the hose during and after the vulcanization, thereby appreciably facilitating the ability to maintain manufacturing tolerances. In this connection, support element rings that are preferably comprised of coils have the advantage over one-piece metal rings that they elastically counter hose deformations caused by external effects, whereas such metal rings suffer permanent deformations and even break and then destroy the hose. The inventive outer and inner support elements prevent changes in the circumference of the hose to only a partial extent at selected points, such as in the region of the shoulders, so that in the remaining portion the entire flexibility, with all of the advantages resulting therefrom, of a hose that is not stiffened via inserts is retained. The inventive inner support elements could also be comprised of a plurality of sleeves, ring elements, or round-bar pieces that conform to the circumferential curvature of the hose wall, with the ends of these components contacting one another in such a way that they are joined together to form a ring. In this connection, these elements could be held together by an inner or outer guide element that is embodied as a cord or a tube for the purpose of facilitating manufacture.

Pursuant to one expedient specific embodiment of the present invention, further inner support elements are distributed over the length of the conveying hose between the shoulders thereof. These further support elements extend over the circumference of the hose in the inner rubber layer. These further support elements are stable in length with respect to forces that tend to reduce their circumference. Furthermore, these support elements elastically absorb hose deformations in order to prevent a collapsing and hence a total blockage of the hose due to external factors.

Further specific features of the present invention will be described in detail subsequently.

DESCRIPTION OF PREFERRED EMBODIMENTS

Referring now to the drawings in detail, the inner side of the wall of a rubber hose, which in a known manner comprises a reinforcing liner 1 with an outer rubber layer 2, has a means to protect against wear in the form of a rubber layer 3. Distributed on the hose at intervals and on the axial extension thereof are sleeve or collar-like floating members 4 that extend around the hose; the parts of the floating member 4 are fixedly interconnected in a customary manner (not illustrated). Provided on the inner periphery of the floating member 4 is a circumferential groove or recess 5 that overlaps or extends over a corresponding shoulder 6 of the outer rubber layer 2. Outer support elements 7 and inner support elements 8 are fixedly embedded in the hose wall in the region of the shoulders 6. In this connection, the outer support elements 7 are fixedly disposed on the reinforcing liner 1 and comprise a band of several mesh or fabric plies. The inner support elements 8 are provided below the reinforcing liner 1 in the inner rubber layer 3 and in this embodiment are configured as coils 9 of steel section, the windings 10 of which rest against one another (see FIG. 2).

Figure 2:
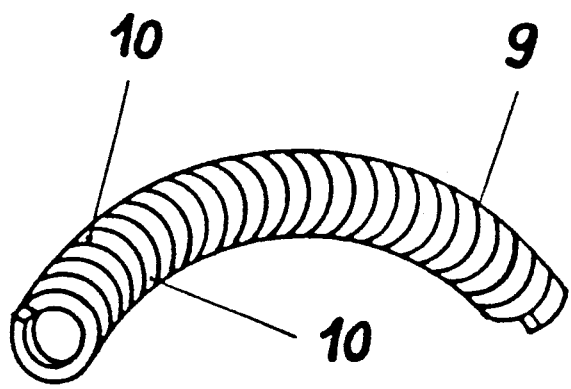
FIG. 2 is a partial view of one exemplary embodiment of an inner support element used in the hose of FIG. 1.

Further inner support elements 15 are embedded between the shoulders 6. These support elements 15 are also comprised of coils 9 having their winding 10 resting against one another (FIG. 2).

Figure 3:
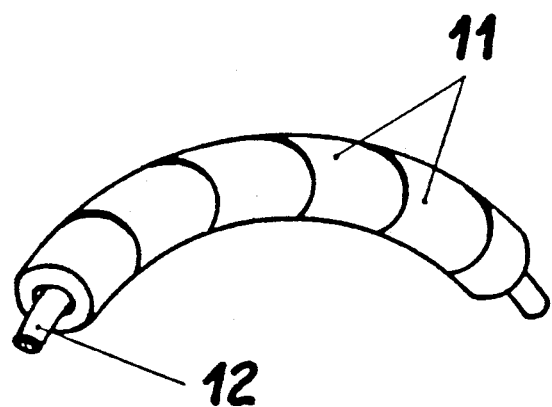
FIG. 3 is a partial view of another exemplary embodiment of an inner support element for the hose of FIG. 1.

The portion of the support element illustrated in FIG. 3 comprises a plurality of curved sleeves 11 that are joined together to form a ring. The ends of the sleeves 11 rest against one another and are disposed on a guide element that is embodied as the cord 12.

Figure 4:
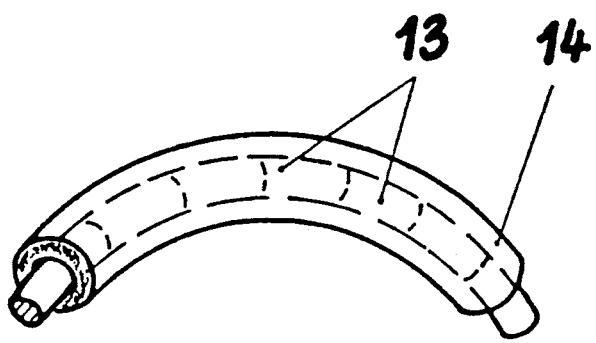
FIG. 4 is a partial view of a third exemplary embodiment of an inner support element for the hose of FIG. 1.

FIG. 4 shows a portion of a ring-like inner support element that comprises a plurality of curved round-bar pieces 13, the ends of which abut one another. The pieces 13 are embedded in a tube 14 that acts as a guide element.

The present invention is, of course, in no way restricted to the specific disclosure of the specification and drawings, but also encompasses any modifications within the scope of the appended claims.

What I claim is:

1. A conveying hose having a hose wall that is provided with reinforcement, at least one segmented, collar-like floating member that extends about said hose, and at least one shoulder that is disposed on the outer side of said hose, extends about the periphery thereof, and extends into a correspondingly shaped recess in said floating member, said hose further comprising:

outer support elements embedded within said hose wall outwardly of said reinforcement thereof and in the area circumscribed by the shoulder thereof; and inner support elements embedded within said hose wall inwardly of said reinforcement thereof and in the area circumscribed by the shoulder thereof, with said outer and inner support elements essentially being aligned with one another, and with portions of the length of said hose being free of said outer and inner support elements, which are elastically deformable and counteract an enlargement of the circumference of said hose when internal pressure increases, and counteract a reduction of the circumference of said hose when axially directed tension stresses increase.

2. A conveying hose according to claim 1, in which each of said outer support elements comprises at least one layer that extends about said hose and is made of a metal and/or fabric mesh.

3. A conveying hose according to claim 1, in which each of said outer support elements comprises an at least single-ply coil having a pitch of approximately 90° relative to the longitudinal axis of said hose.

4. A conveying hose according to claim 1, in which each of said inner support elements comprises at least one coil that forms a ring and has windings that rest against one another.

5. A conveying hose according to claim 1, in which each of said inner support elements comprises a plurality of sleeves, ring-like members, or round-bar pieces that are adapted to the circumferential curvature of said hose wall and are assembled to form a ring by having their ends rest against one another.

6. A conveying hose according to claim 5, in which said inner support elements are comprised of sleeves or ring-like members that are disposed on an inner guide element that is in the form of a cord.

7. A conveying hose according to claim 5, in which said inner support elements are comprised of round-bar pieces that are embedded in a tube that forms a guide element.

8. A conveying hose according to claim 1, in which said hose wall has an inner rubber layer, over the length of which, between said shoulders, are distributed further inner support elements that are formed of coils that are assembled to form a ring, with the windings of said coil resting against one another.

9. A conveying hose according to claim 1, in which said hose wall has an inner rubber layer, over the length of which, between said shoulders, are distributed further inner support elements that are formed of a plurality of sleeves, ring-like members, or round-bar pieces that are adapted to the circumferential curvature of said hose wall and are assembled to form a ring by having their ends rest against one another.

10. A conveying hose according to claim 1, in which said outer support elements rest securely upon said reinforcement means.

11. A conveying hose according to claim 1, in which said inner support elements are embedded entirely within said hose wall.

* * * * *